United States Patent

Schauder

[19]

[11] Patent Number: 4,862,054
[45] Date of Patent: Aug. 29, 1989

[54] TACHO-LESS VECTOR CONTROL ADAPTIVE SYSTEM FOR MOTOR DRIVE

[75] Inventor: Colin D. Schauder, Murrysville, Pa.

[73] Assignee: Westinghouse Electric Corp., Pittsburgh, Pa.

[21] Appl. No.: 265,094

[22] Filed: Oct. 31, 1988

[51] Int. Cl.$^4$ .......................................... H02P 5/40
[52] U.S. Cl. ..................... 318/800; 318/805
[58] Field of Search ........ 318/800, 802, 803, 807–811; 324/158 MG

[56] References Cited

U.S. PATENT DOCUMENTS

| | | | |
|---|---|---|---|
| 3,909,687 | 9/1975 | Abbondanti | 318/805 |
| 4,009,427 | 2/1977 | Takahashi | 318/227 |
| 4,481,457 | 11/1984 | Zach | 318/803 |
| 4,503,376 | 3/1985 | Okuyama | 318/802 |
| 4,680,526 | 7/1987 | Okuyama et al. | 318/802 |
| 4,733,149 | 3/1988 | Culberson | 318/561 |

Primary Examiner—David Smith, Jr.
Attorney, Agent, or Firm—C. M. Lorin

[57] ABSTRACT

Adaptive control is used in an asynchronous motor drive. A reference model based on the model equation of the motor is combined with an adjustable model responsive to the direct and quadrature components of the current and to an estimated speed. An adaptive mechanism counting in a P-I amplifier expands to the direct deviation between the direct and quadrature components of the flux outputed by the two models and generates a feedback signal representing the estimated speed. The adjustable model reacts to such feedback signal so that the estimated speed readily becomes the actual speed of the motor. As a result, a tacho-less AC motor drive is obtained in which under any running conditions the motor immediately takes the required speed.

5 Claims, 7 Drawing Sheets

TACHO-LESS VECTOR CONTROL ADAPTIVE SYSTEM FOR MOTOR DRIVE

BACKGROUND OF THE INVENTION

The invention relates to motor drives in general, and more particularly to a motor drive wherein an adaptive system associated with vector control is used concurrently with instantaneous identification of the speed parameter.

Variable speed induction motor drives using static inverters are widely used. When dynamic performance is not important, the speed of the motor drive is simply adjusted by changing the frequency at the input while keeping the volt-hertz ratio constant. There are situations, however, requiring fast response, for instance in servo-applications. Then, feedback from speed information from the rotating shaft of the machine is usually required. Such feedback is part of a closed loop for control, or it may be part of the torque control algorithm for the determination of the slip frequency of the motor excitation. In such instances, typically, a tachometer, or a high resolution encoder, is mounted on the motor shaft in order to provide such speed feedback.

The present invention is directed to speed control of an induction motor drive with dynamic response, but without the use of any feedback transducer on the motor shaft. High performance speed control where it is uneconomical, or impractical, to have a shaft-mounted speed transducer, is desirable. This is the case with linear-motor-driven transportation systems, or with steel mill drives because transducer cabling is undesirable in an environment which is inhospitable around the motor. It is also the case with retrofit applications where an existing induction motor having no shaft transducer installed, needs to be speed-controlled. A tacho-less speed measurement is also useful for induction motor control and protection applications. Speed information derivation is particularly useful for "intelligent" motor protection, whatever the nature and performance of the drive.

Tacho-less induction motor control is known. See for instance: U.S. Pat. No. 4,009,427 of Shuichi Takahashi and U.S. Pat. Nos. 4,503,376 and 4,680,526 both of Toshiaki Okuyama.

The invention involves estimating the speed of an induction motor with good dynamic response and accuracy as if it were a rapidly changing parameter of the system. To this effect, recourse has been made to prior art methods of parameter estimation, using Model Reference Adaptive Control.

Model Reference Adaptive Control has been described "Adaptive Control—The Model Reference Approach" by Yoan D. Landau, published by Marcel Dekker, Inc. N.Y. 1979. This approach involves two models of the subject system, both having the same mathematical structure, both being fed with the same inputs. One of the models called the "reference model", is fixed as regards its parameters, while the other has variable parameters and is called the "adjustable model". An "adaptation mechanism" is used to dynamically adjust the parameters of the adjustable model until operation thereof coincides with the operation of the reference model. Control of the adaptation mechanism to this effect results from signals derived from the two models which represent the instantaneous difference between the state variables, or the outputs of the two models. The Landau publication is incorporated by reference.

It is known to identify the speed of an inverter-fed induction motor by the technique of Model Reference Adaptive Control. See for instance: "Speed Sensor-less Vector Control of Induction Motor with Model Reference Adaptive System" by Shinzo Tamai, Hidehiko Sugimoto and Masao Yano on pages 189 to 195, a paper presented at a IEEE Conference in Atlanta, Ga. on 18-23 Oct. 1987 IA Vol. 1. This article is hereby incorporated by reference.

Other articles of interest are: (1) "Observers for Flux Estimation in Induction Machines" by George C. Verghese and Seth R. Sanders IEEE Trans. Industrial Electronics, Vol. 35, No. 1, February 1988, pp. 85–94; 2) Electrical Engineering in Japan, Vol. 107, No. 4, 1987 "Vector Control System for Induction Motor Using a Speed Estimation Based on Instantaneous Slip Frequency Principles" by Hirotami Nakano, Schinichi Horie, Tsuyoshi Matsuo and Kohji Iwata, pp. 95–103.

U.S. Pat. Nos. 4,009,427 and 4,733,149 relate to adaptive control of an induction motor.

SUMMARY OF THE INVENTION

The invention provides for the identification of the speed of an induction motor as a rapidly changing parameter of the system, using a reference model and an adjustable model of the induction motor under inputs of sensed stator terminal voltages and currents. The estimated speed is used as the variable parameter of the adjustable model. This estimate is generated by an adaptation mechanism which is a functional block acting upon inputs which are sensitive to errors between the outputs of the reference model and the adjustable model. The speed estimate is thus made to track the actual speed and can be used as a speed feedback in a closed loop speed control, or in a torque control algorithm where it is important to determine the slip frequency, or for motor protection while implementing motor control.

DESCRIPTION OF THE INVENTION

Figure 1:
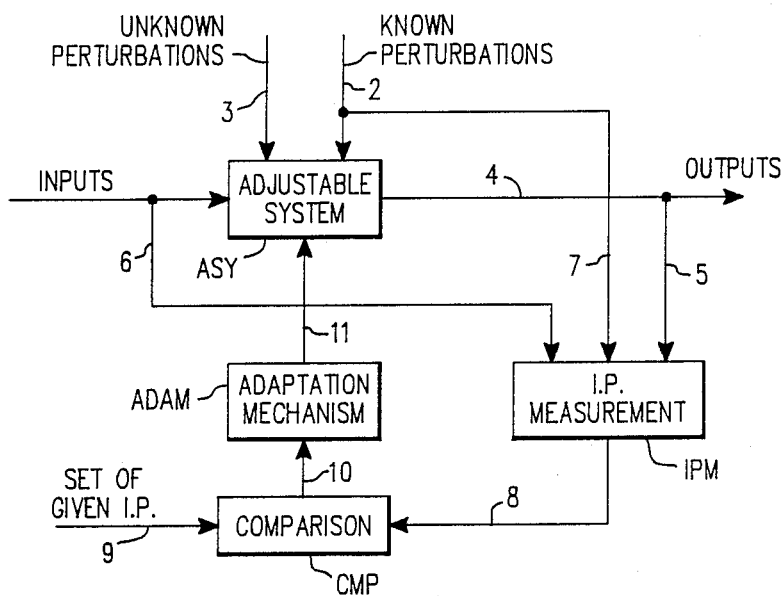
FIG. 1 shows in block diagram the basic configuration of an adaptive system.

FIG. 1 shows the basic configuration of an adaptive system. Adaptive control differs from classical feedback control in that instead of eliminating the effects of state perturbations, it measures an index of performance using the inputs states and the outputs of an adjustable system to either adjust the parameters, or modify the input, in order to maintain the performance index. As shown by FIG. 1, the input states are received on line 1 by the adjustable system ASY, together with the known perturbations on line 2, and the unknown perturbations on line 3. The outputs from the adjustable system ASY are on line 4. Line 1 by line 6, line 2 by line 7, and line 4 by line 5, are inputted into an index of performance measurement block IPM which, with those three kinds of inputs, generates on line 8 a measured index of performance. The latter is compared by a comparator CMP with the reference index performance indications of line 9. As a result, in line 10 data is given to the adaptation mechanism ADAM which generates on line 11 the compensation needed for both the known and unknown perturbations.

Figure 2:
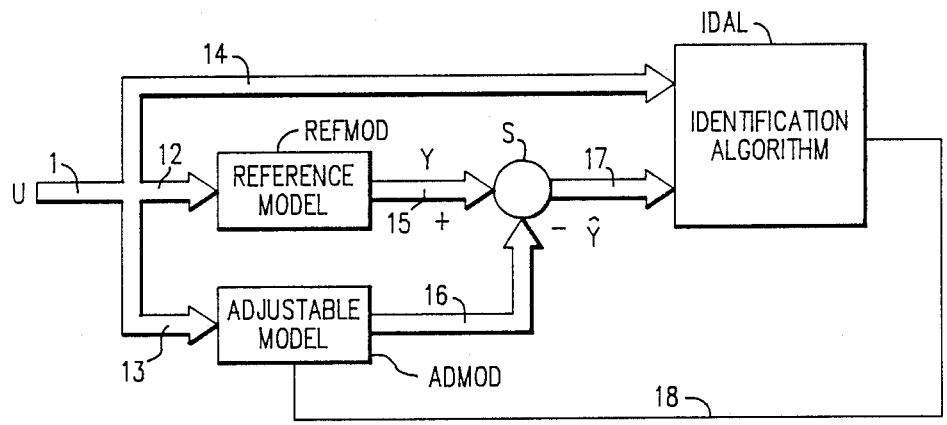
FIG. 2 is a block diagram of a basic model reference adaptive system.

The proposed speed identification system makes use of the parameter identification capability inherent in a model reference adaptive system. Model reference adaptive systems (MRAS) have been described in the aforementioned book by Landau. FIG. 2 (taken from FIG. 1, page 190, of the aforestated Tamai, Sugimoto and Yano article from an IEEE 1987 paper) shows the basic block of a parameter identifier including reference model (REFMOD), adjustable model (ADMOD) and identification algorithm (IDAL). The control input u from line 1 goes by line 12 to the reference model (REFMOD), by line 13 to the adjustable model (ADMOD) and by line 14 to the identification algorithm (ADAL). The latter receives on line 17 the difference between the output (on line 15 from REFMOD and the output (on line 16) from ADMOD, as derived by comparator S. The output on line 18 from IDAL goes to the adjustable model ADMOD to provide the adjustment to the error from line 17.

The object of the present invention is to choose suitable models of the induction motor and provide a corresponding identification, or adaptation, algorithm (IDAL on FIG. 2) which will identify the speed of the motor (on line 18) with the comparison by comparator S leading to a match between the states of the reference model of line 15 and the states of the adjustable model of line 16.

The model reference control technique is applied, according to the present invention, to an induction motor represented by the following equations:

$i_{ds}$, $i_{qs}$, and $v_{ds}$, $v_{qs}$ are the stator currents and voltages, respectively, expressed in a coordinate frame of reference which is rotating at angular velocity;
where:
$i_{dr}$, $i_{qr}$ and $\lambda_{dr}$, $\lambda_{qr}$ are the rotor currents and flux components, respectively, expressed in a coordinate frame of reference rotating at angular velocity $\omega$.

These equations represent a simplified coupled-circuit model of the machine, neglecting parasitic effects and non-linearities. The equations are presented for the case of an arbitrary reference frame velocity given by $\omega$. The first two rows are loop equations for the stator circuits, termed "stator equations". The bottom two rows are similarly representing the "rotor equations". It is observed that the stator equations do not include any terms dependent on the rotor speed, whereas the rotor equations do include such terms. Either pair of equations can be regarded as a valid mathematical model describing the rotor flux components in terms of terminal voltage and current inputs. Thus, are provided two independent models of the machine with one influenced directly by the motor speed and the other not depending on speed directly. The basic concept used for speed identification consists in using the stator equations as the "reference model" and the rotor equations as the "adjustable model". An adaptation algorithm must, then, be provided in order to enable a continuously updated speed estimation leading to a good dynamic performance of the identification process.

Figure 3:
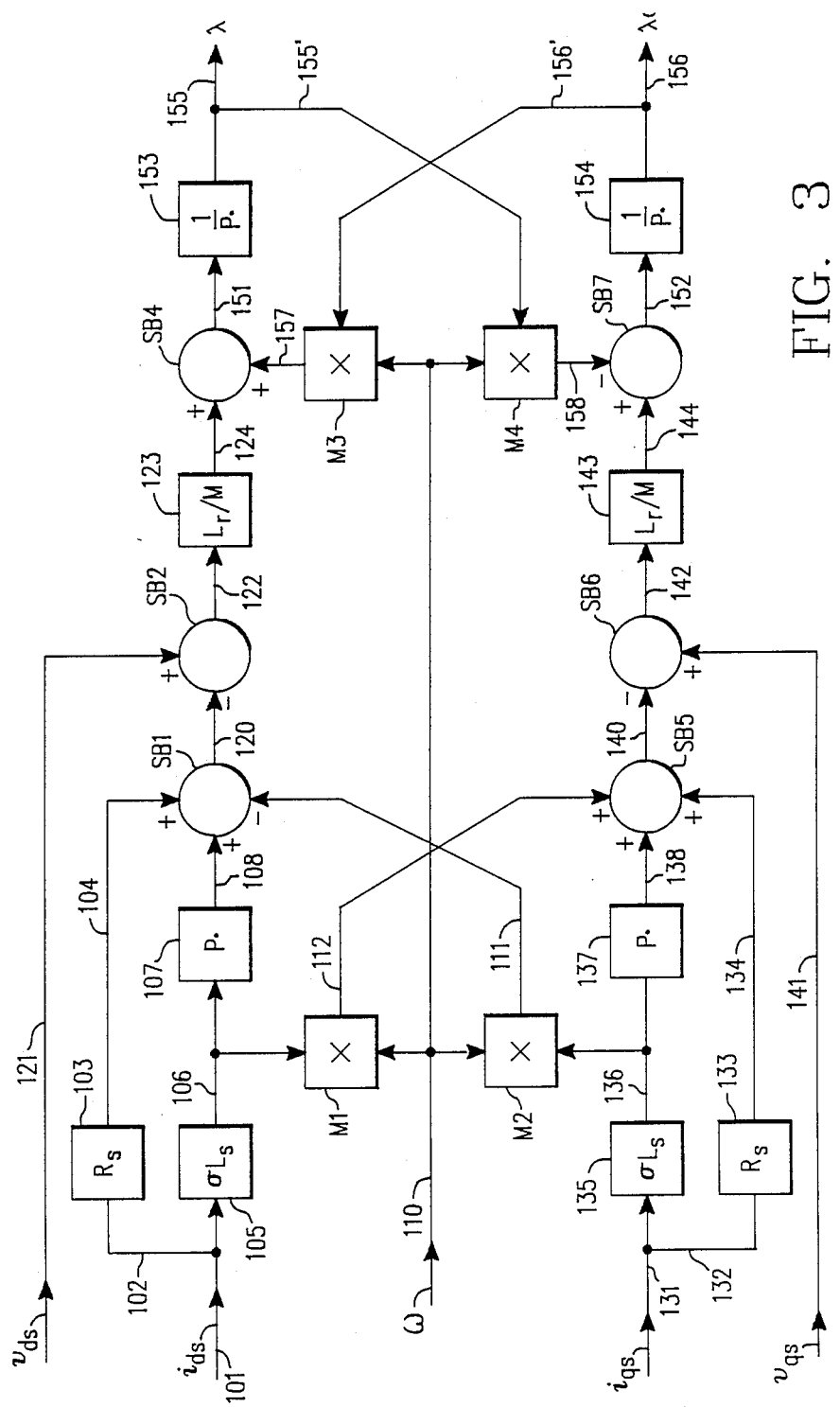
FIG. 3 is a model representation in diagram form used for the derivation of the rotor flux components on the basis of the induction motor stator equations.

FIG. 3 is a block diagram illustrating the use of the aforestated stator equations (first two rows under (1) hereabove) for the derivation of the rotor flux components.

The direct component of the stator current $i_{ds}$ is applied on line 101 and multiplied at 103 by the resistance $R_s$ of the stator, the outputted voltage drop $R_s i_{ds}$ being by line 104 inputted into one side of a comparator SB1. The stator current direct component $i_{ds}$ is also multiplied at 105 by $L_s$ (where $\sigma$ as generally known is the leakage coefficient $1 - M^2/L_sL_r$, $L_s$ being the inductance of the stator, $L_r$ being the inductance of the rotor and M the mutual inductance). The output on line 106 is differentiated at 107, with the result, on line 108, being applied to another input of comparator SB1.

$\omega$ is the angular frequency of rotation of the reference frame. It represents the rotational speed of the coordinate system in which the motor flux and other variables are defined. $\omega$ is applied on line 110, then, is multiplied $$\begin{bmatrix} v_{ds} \\ v_{qs} \\ 0 \\ 0 \end{bmatrix} = \begin{bmatrix} (R_s + L_s\sigma p.) & (-\omega L_s\sigma) & ((M/L_r)p.) & (-\omega M/L_r) \\ (\omega L_s\sigma) & (R_s + L_s\sigma p.) & (\omega M/L_r) & ((M/L_r)p.) \\ (-MR_r/L_r) & (0) & ((R_r/L_r) + p.) & (\omega_r - \omega) \\ (0) & (-MR_r/L_r) & (\omega - \omega_r) & ((R_r/L_r) + p.) \end{bmatrix} \begin{bmatrix} i_{ds} \\ i_{qs} \\ \lambda_{dr} \\ \lambda_{qr} \end{bmatrix} \quad (1)$$

where:
$\omega$ = angular velocity of reference frame;
$\omega_r$ = electrical angular velocity of the rotor;
$R_s$, $R_r$, $L_s$, $L_r$, M = motor electrical parameters;
$\sigma = (1 - M^2/L_sL_r)$ = motor leakage coefficient;
where:
$\lambda_{dr} = (Mi_{ds} + L_r i_{dr})$, and
$\lambda_{qr} = (Mi_{qs} + L_r i_{qr})$ are the rotor flux components;
where:

at M1 by the signal of line 106, with the result being applied by line 112 to a comparator SB5.

The quadrature current component $i_{qs}$ of the stator is similarly applied by lines 131 and 132 to location 133 where it is multiplied by the resistor $R_s$ of the stator. The result appears on line 134 and is applied to comparator SB5. The stator quadrature current component is also multiplied at 135 by $\sigma L_s$, the result being outputted on line 136 and multiplied at M2 by $\omega$, to provide on line 111 a third input for comparator SB1. The output of line 136 is also differentiated at 137, with the result, (on line 138) being applied to one input of a comparator SB5 which also receives lines 134 and 112. The output of comparator SB1 (on line 120) is subtracted from the direct component of the stator voltage $v_{ds}$ passed on line 121, the output being on line 122. Similarly, the output of comparator SB5 is subtracted at SB6 from the quadrature component of the stator voltage received on line 141 and the output is on line 142. Summer SB4 sums up (1) the value of line 122 multiplied at 123 by $L_r/M$, the output being on line 124, and (2) the quadrature flux component derived on lines 156 and 156', multiplied at M3 by $\omega$ (derived from line 110). Similarly, summer SB7 sums up (1) the value of line 142 multiplied by $L_r/M$ at 143, the output being on line 144, and (2) the direct flux component derived on lines 155 and 155', multiplied at M4 by $\omega$ (derived from line 110). This is in accordance with the stator equations (two above rows).

Having thus obtained from the stator direct and quadrature components of current and voltage, the direct and quadrature components of the rotor flux, it is noted that this model results in an observer rotating with the reference frame, namely at the speed of rotation $\omega$, and seeing the motor flux in operation. As generally known, the components $i_{ds}$, $i_{qs}$, $v_{ds}$, and $v_{qs}$ are obtained according to rotating-axis transformations which relate them to the actual motor voltages and currents $i_a$, $i_b$, $i_c$ and $v_a$, $v_b$, $v_c$, according to the following well-known formulae:

$$\begin{bmatrix} v_{ds} \\ v_{qs} \end{bmatrix} = 2/3 \begin{bmatrix} \cos(\theta) & -\sin(\theta + \pi/6) \\ -\sin(\theta) & -\cos(\theta + \pi/6) \end{bmatrix} \begin{bmatrix} v_{ab} \\ v_{cb} \end{bmatrix} \quad (2)$$

$$\begin{bmatrix} i_{ds} \\ i_{qs} \end{bmatrix} = -2/\sqrt{3} \begin{bmatrix} \sin(\theta - \pi/3) & \sin(\theta) \\ \cos(\theta - \pi/3) & \cos(\theta) \end{bmatrix} \begin{bmatrix} i_a \\ i_c \end{bmatrix} \quad (3)$$

where: $\theta = \int \omega dt$; with $i_a + i_b + i_c = 0$; and with $v_a + v_b + v_c = 0$ (valid with the phase lines of the motor being without neutral connection, $v_{ab}$ and $v_{cb}$ being line-to-line voltages).

Figure 5:
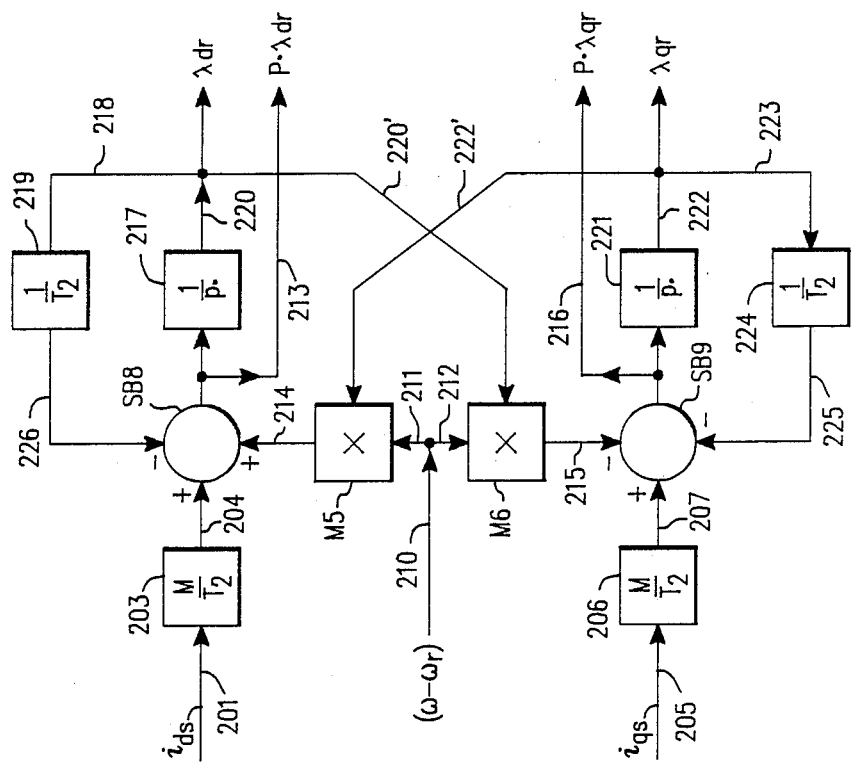
FIG. 5 is a model representation in diagram form used for the derivation of the rotor flux components on the basis of the induction motor rotor equations.

Based on the two last rows of the aforestated equations for the rotor of an induction motor, FIG. 5 shows the derivation of the direct and quadrature flux components of the rotor flux. It is assumed that T2 is the ratio $L_r/R_r$ of the inductance to the resistance of the rotor. It is observed here that the slip of the rotor $\omega - \omega_r$, relative to the reference frame, appears as a parameter, thus, representing the direct influence of rotor speed $\omega_r$ on this particular model. On lines 201 and 205 are inputted $i_{ds}$ and $i_{qs}$, respectively. They both are multiplied by $M/T2$ at 203 and 206, respectively, with respective outputs on lines 204 and 207, which are inputted into corresponding comparators SB8 and SB9. The output of SB8 provides $p.\lambda_{dr}$ on line 213, whereas the output of SB9 provides $p.\lambda_{qr}$ on line 216. These two values are integrated one at 217 to give $\lambda_{dr}$ on line 220, and the other at 221 to give $\lambda_{qr}$ on line 222. There is a feedback by line 218 with multiplication by $1/T2$ at 219 and an input by line 226 into SB8 for $\lambda_{dr}$. Similarly, there is a feedback by line 223 with a multiplication by $1/T2$ at 224 and an input by line 225 into SB9 for $\lambda_{qr}$. The output of lines 220 and 222 are criss-crossed with multipliers M5 and M6, each multiplier being otherwise operating with $(\omega - \omega_r)$ of line 210 and with the associated summer SB8, SB9. This is according to the two last equations of the induction motor equations.

Figure 4:
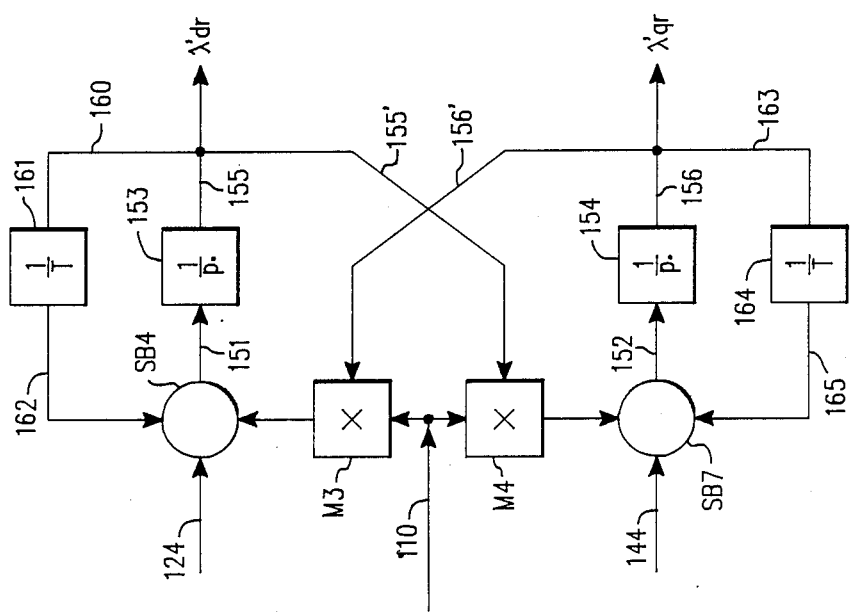
FIG. 4 shows a modification of the output of the model of FIG. 3 for the derivation of "auxiliary" flux variables.

FIG. 4 is according to the aforementioned Tamai and Yano article (IEEE 1987 pp. 189-195) where it is described how to substitute for variables $\lambda_{dr}$ and $\lambda_{qr}$, "auxiliary" variables $\lambda'_{dr}$, $\lambda'_{qr}$, defined by the following equations:

$$p.\lambda_{dr} - \omega\lambda_{qr} = (p. + 1/T)\lambda'_{dr} - \omega'_{qr}$$

$$\omega\lambda_{dr} + p.\lambda_{qr} = \omega\lambda'_{dr} + (p. + 1/T)\lambda'_{qr}$$

Figure 6:
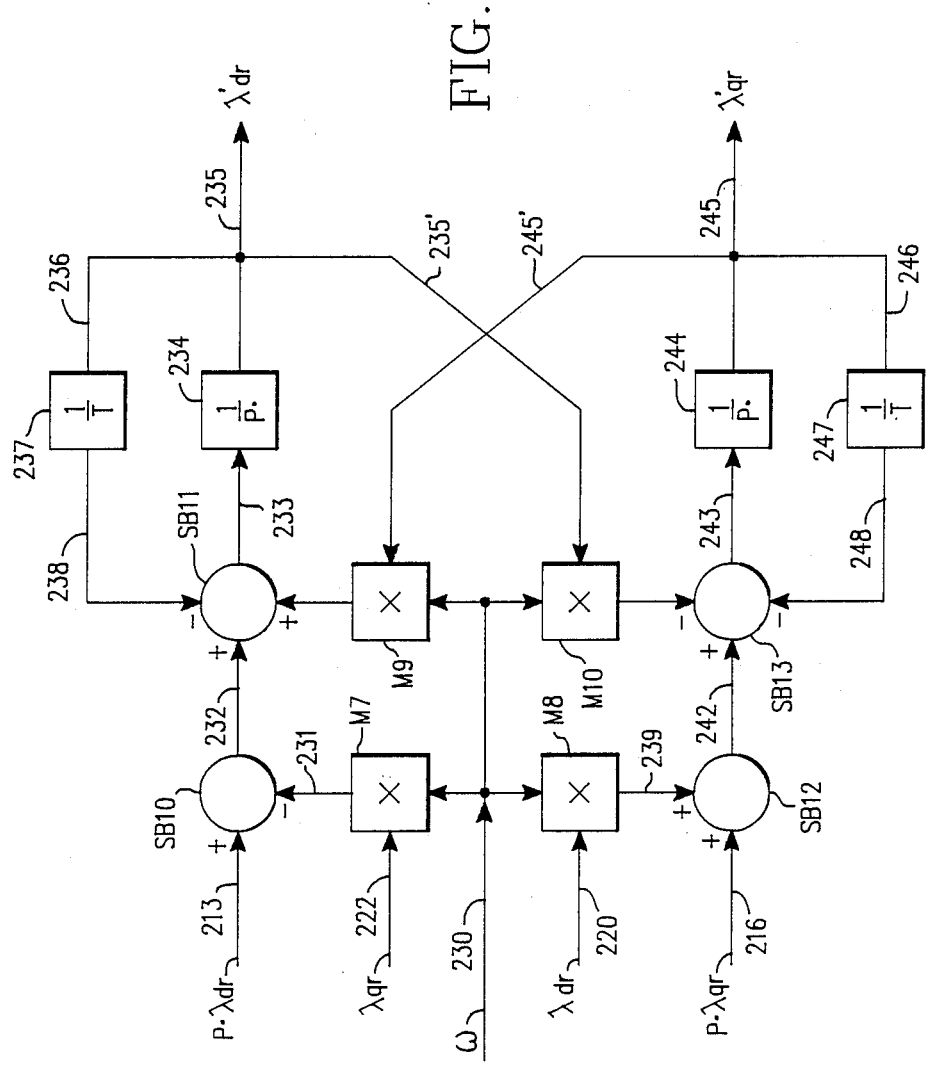
FIG. 6 is like FIG. 5 but modified so as to derive "auxiliary" flux variables.

In essence, this amounts to replacing the pure integrators located at the output of the model by first order filters of time constant T. This has practical advantages, while still retaining the usefulness of the model for identification purposes. The same transformations are implemented behind the outputs (220, 213, 222, and 216) of $\lambda_{dr}$, $p.\lambda_{dr}$, $\lambda_{qr}$ and $p.\lambda_{qr}$, in FIG. 5, as shown in FIG. 6, so that auxiliary variables are likewise generated as outputs of the "rotor" model. The reference frame speed $\omega$ is applied on line 230, and it goes to multipliers M7, M8, M9 and M10. Line 222 goes also to multiplier M7, while line 220 goes to multiplier M8. Line 213 is inputted into comparator SB10 which also receives the output of line 231 from multiplier M7. Also line 216 goes into comparator SB12 which also receives the output on line 239 from multiplier M8. Multiplier M9 and line 232 from SB10 are received by comparator SB11 to provide, after integration at 234, the auxiliary variable $\lambda'_{dr}$ (on line 235). Multiplier M10 and line 242 from SB12 are received by comparator SB13 to provide after integration at 244 the auxiliary variable $\lambda'_{qr}$ (on line 245). Line 235, by line 236, is fed back to SB11 after multiplication by $1/T$. Line 245, by line 246, is fed back to SB13 after multiplication by $1/T$. Lines 235 and 245 are criss-crossed by lines 235' and 245' with the multipliers M9 and M10.

Figure 7:
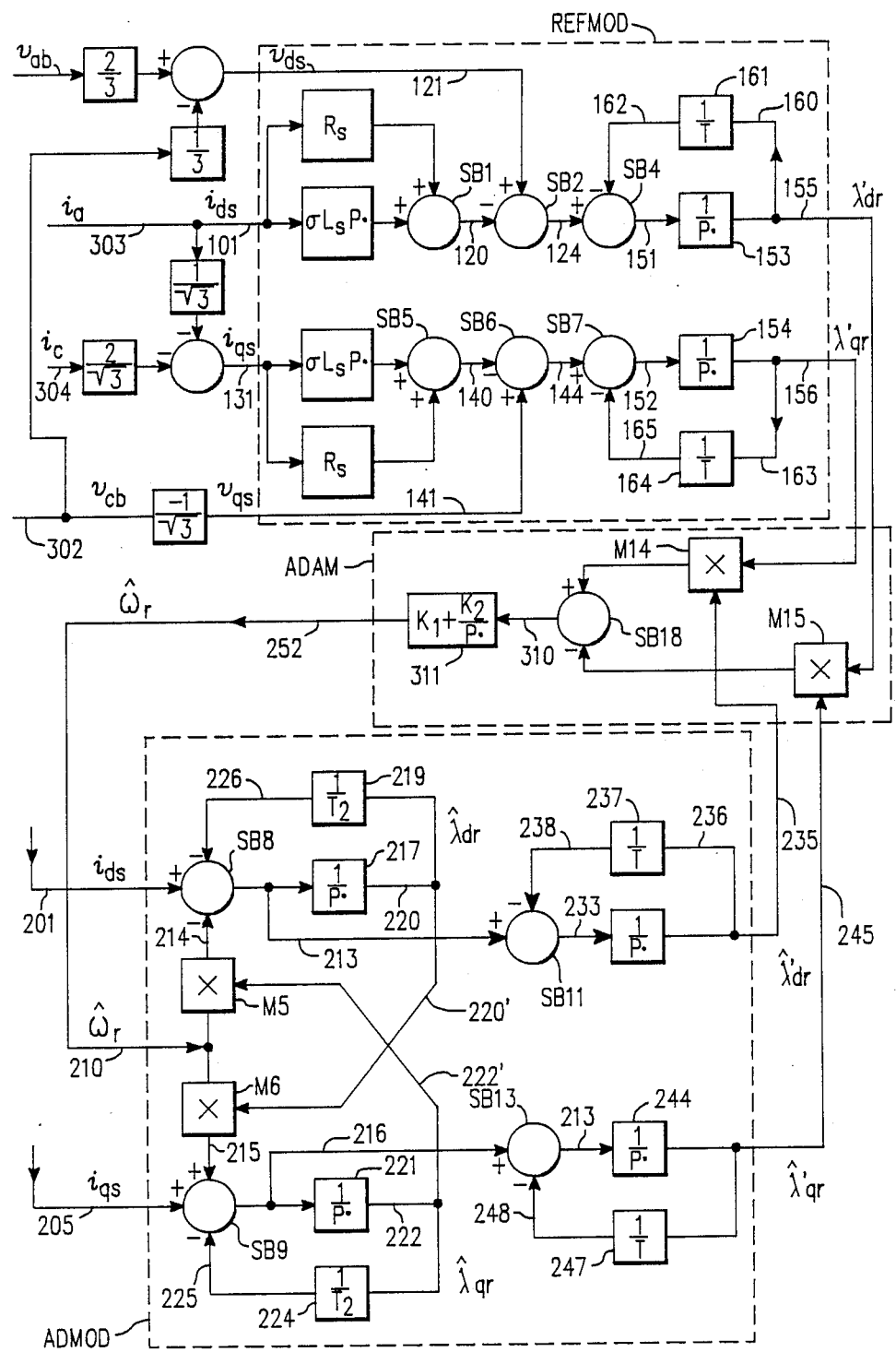
FIG. 7 is a block diagram of the speed identification system according to the present invention.

Referring to FIG. 7, induction motor speed identification according to the present invention will now be described, wherein a specific choice of reference frame velocity is made for that purpose. $\omega$ is chosen to be zero, a clear departure from the prior art given in the aforestated paper presented by Shinzo Tamai, Hidehiko Sugimoto and Masao Yano (pages 189-195) at the Atlanta IEEE conference of 18-23 Oct. 1987. This condition is fundamental to the successful operation of the method proposed according to the invention. When $\omega = 0$ is applied to the models as a constraint, a significant simplification appears in the stator model (see FIGS. 3 and 4) as well as in the rotor model (see FIGS. 5 and 6). Matrix (1) becomes as follows:

$$\begin{bmatrix} v_{ds} \\ v_{qs} \\ 0 \\ 0 \end{bmatrix} = \begin{bmatrix} (R_s + L_s\sigma p.) & (0) & (M/L_r)p. & (0) \\ (0) & (R_s + L_s\sigma p.) & (0) & (M/L_r)p. \\ (-MR_r/L_r) & (0) & (R_r/L_r + p.) & \omega_r \\ (0) & (-MR_r/L_r) & -\omega_r & (R_r/L_r + p.) \end{bmatrix} \begin{bmatrix} i_{ds} \\ i_{qs} \\ \lambda_{dr} \\ \lambda_{qr} \end{bmatrix} \quad (4)$$

Also when $\omega = 0$, the rotating axis transformation is made according to the following equations:

$$\begin{bmatrix} v_{ds} \\ v_{qs} \end{bmatrix} = 2/3 \begin{bmatrix} 1 & -1/2 \\ 0 & -3/2 \end{bmatrix} \begin{bmatrix} v_{ab} \\ v_{cb} \end{bmatrix} \quad (5)$$

$$\begin{bmatrix} i_{ds} \\ i_{qs} \end{bmatrix} = -2/\sqrt{3} \begin{bmatrix} -\sqrt{3}/2 & 0 \\ 1/2 & 1 \end{bmatrix} \begin{bmatrix} i_a \\ i_c \end{bmatrix} \quad (6)$$

This will appear more clearly from the block diagram of FIG. 7. Referring to FIG. 7, the motor supply voltages and currents $V_{ab}$, $V_{cb}$, $i_a$, and $i_c$ (on respective lines 301, 302, 303, 304) are shown as derived and converted into $v_{ds}$, $v_{qs}$, $i_{ds}$ and $i_{qs}$ (on lines 121, 141, 101, 131). This transformation involves only multiplication by constants and addition, since the reference frame is now assumed to be stationary.

The reference model REFMOD, based on the stator equations, is essentially the same as in FIGS. 3 and 4, however, since $\omega = 0$, it is simplified. Therefore, line 110 and multipliers M1, M2, M3, M4, no longer exist, nor lines 111, 112, 155', 156'. FIG. 7 also differs from FIG. 3 in that blocks 105 and 107 have been put together, and and also blocks 135 and 137, an equivalent combination of two successive functions. Also, blocks 123 and 143 have been made unity gain blocks. They are, thus, effectively eliminated, due to the fact that each block represents a simple gain factor which can be taken into account separately elsewhere, namely, in the adaptation mechanism. When the speed of reference is made $\omega = 0$, the ADMOD, based on the rotor equations, is simplified in that $\hat{\omega}_r$ is inputted on line 210 while, in contrast to FIG. 6, multipliers M7, M8, M9 and M10 no longer exist, nor do lines 230, 235' and 245'. In the same way, blocks 203 and 206 of FIG. 5 have been made unity gain blocks thus, do not appear on FIG. 7.

From FIG. 7, it is seen that on a first pair of lines (155 and on 156) and a second pair of lines (235 and 245) are generated two independent estimates of the auxiliary variables $\lambda'_{dr}$ and $\lambda'_{qr}$, respectively, both in relation to the sensed voltages and currents of lines 301 to 304, while using computation blocks which have been very much simplified by choosing $\omega = 0$. Block REFMOD provides the first estimate, namely $\lambda'_{dr}$, $\lambda'_{qr}$, which is inherently correct. The second estimate is $\hat{\lambda}'_{dr}$, $\hat{\lambda}'_{qr}$, generated by block ADMOD, and its correctness depends upon the present value of the motor speed estimate $\hat{\omega}_r$ which is used in block ADMOD.

An adaptation mechanism ADAM is used which is of central importance in the operation of the system according to the present invention. It is based on a fundamental non-linear control theory contained in the aforestated book by Landau. It has been derived from it through complex mathematics. It has proved its effectiveness in practice. The interaction of blocks REFMOD and ADMOD through the adaptation mechanism ADAM may be summarized as follows:

$\lambda'_{dr}$ and $\lambda'_{qr}$ can be regarded as the two coordinates of a vector $\bar{\lambda}'$ of magnitude $\lambda'$ and angle $\theta'$. Likewise, $\hat{\lambda}'_{dr}$ and $\hat{\lambda}'_{qr}$ are the two coordinates of a vector $\hat{\bar{\lambda}}'$ of magnitude $\hat{\lambda}'$ and angle $\hat{\theta}'$. The angle $\hat{\theta}'$ is monotonically sensitive to the value of $\hat{\omega}_r$, a small change in $\hat{\omega}_r$ causing a change of corresponding polarity in the value of $\hat{\theta}'$. In essence, the adaptation mechanism ADAM detects in the angle difference $(\theta' - \hat{\theta}')$ whether the outputs of REFMOD and ADMOD are coinciding, whether the two blocks are matched. Whenever the angle difference $(\theta' - \hat{\theta}')$ is non-zero, the adaptation mechanism ADAM causes the value of $\hat{\omega}_r$ on line 252 to be such as to draw a change in $\hat{\theta}'$ such as to drive the angle difference $(\theta - \hat{\theta}')$ to zero. This action is similar to the action of a phase-locked loop. Block ADAM performs the following functions:

$$\hat{\omega}_r = (K1 + K2/p.)[\lambda'_{dr}\hat{\lambda}'_{qr} - \hat{\lambda}'_{qr}\lambda'_{dr}];$$

where:

$\lambda'_{dr} = \lambda' \cos(\theta')$; $\lambda'_{qr} = \lambda' \sin(\theta')$; $\hat{\lambda}'_{dr} = \hat{\lambda}' \cos(\hat{\theta}')$ and $\hat{\lambda}'_{qr} = \hat{\lambda}' \sin(\hat{\theta}')$ It appears that this function is equivalent to:

$$\hat{\omega}_r = \left(K1 + \frac{K2}{p.}\right)\left[\frac{\sin(\theta - \hat{\theta}')}{\lambda'\hat{\lambda}'}\right]$$

For small angle error and approximately constant magnitudes, this function is essentially driven by the angle error $(\theta' - \hat{\theta}')$, thereby providing the aforestated "phase-locked loop" action. The implementation of block ADAM is shown in FIG. 7 by the combination of line 156, multiplier M14 and line 235, and the second term by the combination of line 155, multiplier M15 and line 245. Summer SB18 accounts for the negative sign thereabove.

A proportional plus integral function block 311 responds to the accumulated errors from line 310 at the output of SB18 and provides on line 252, once the adjustment process has been stabilized, an estimated speed $\hat{\omega}_r$ which matches the actual speed is available.

Considering now the operation of the speed identification system of FIG. 7, the following is explanatory of how the general combination of REFMOD, ADMOD and ADAM in the adaptive system theory becomes effective, with the simplified version according to the present invention, in providing a rapid and steady identification of the speed of the rotor of an induction machine.

REFMOD provides on lines 155 and 156 signals representative of the direct and quadrature components of the auxiliary variable vector $\lambda'$ of the rotor as expressed by the model reference equations from the stator currents and voltages: on lines 101, 131, for the currents, on lines 121 and 141 for the voltages. This results in a model of the induction machine based on the first two rows of the basic matrix, used according to the present invention with $\omega = 0$, that is for a stationary reference frame. These equations being based on the stator formulation do not depend directly upon the speed. In contrast, ADMOD being based on a rotor formulation provides a model of the induction machine using equations taken from the last two rows of the matrix, also with $\omega = 0$, which does not call for the terminal voltage, but requires the rotor speed.

The two models each provide the auxiliary outputs as a representation of the induction machine in operation. However, whatever the speed parameter, the model of REFMOD derived from the voltage and current parameters is a true representation of the induction machine in operation. In contrast, with ADMOS, it will represent the same machine in operation only if, besides the current inputs, the speed estimate input (line 210) is correct. The determination of $\hat{\omega}_r$ is effected by the adaptation mechanism ADAM in response to the error derived from line 310 between opposite pairs of outputs (lines 155 and 156 and lines 235 and 245) from REF- MOD and ADMOD. Now in response to an error on line 310 the proportional plus integral circuit 311 will adjust the frequency signal of line 252. This can be compared to the operation of a phase-locked loop. A phase-locked loop (PLL) responds to the detection of a change in phase of the power supply by applying to a variable frequency oscillator a control signal which will cause a change in frequency matching the error. It is the function of the compensating circuit ADAM to so modify the input of line 210 that the auxiliary variables at the output of ADMOD will match the auxiliary variables at the output of REFMOD.

Figure 8:
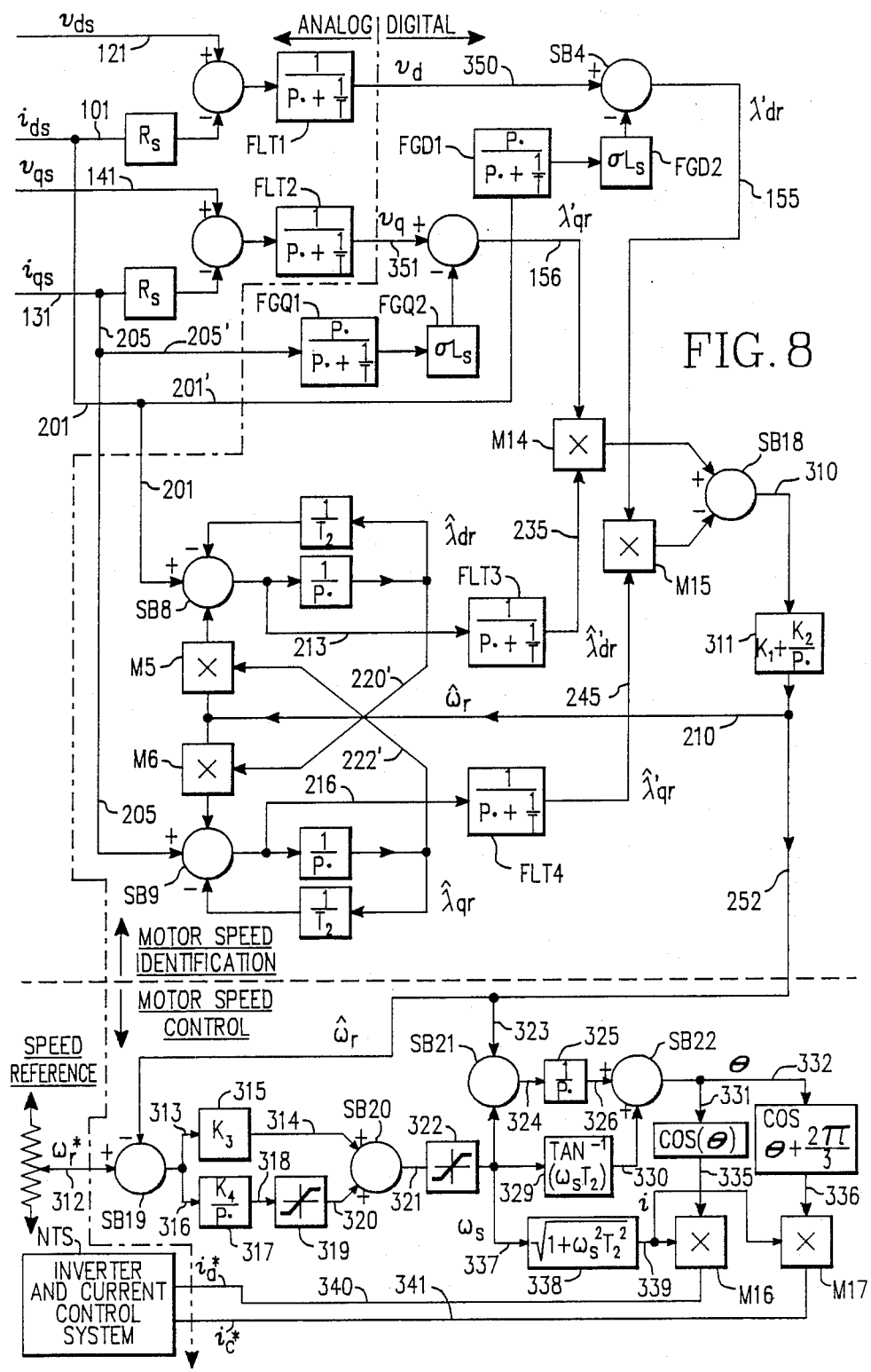
FIG. 8 is the speed identification system of FIG. 7 combined with motor drive control.

Having derived a signal representative of speed, control of the motor drive is illustrated in FIG. 8 wherein such speed representative signal is compared with a reference speed signal for matching by the inverter and current control system of the motor drive.

According to the preferred implementation, shown in FIG. 8, in the REFMOD portion of the speed identification system a portion of the circuitry is performed with analog means, and another portion is digitally performed by a computer, these two portions being separated by a conversion from analog-to-digital (symbolized by a dotted line). At 350 for line 101 and at line 351 for line 131, the signal is multiplied by Rs the resistance of the stator, thus, like at 103 and at line 133 in FIG. 3, but here accomplished on the analog side. In the same way, the functions of blocks 161 and 153 of FIG. 4 have been converted into an equivalent generator function $1/(p.+1/T)$ which amounts in analog form to a filter FLT1 for the $v_{ds}$ and $R_s i_{ds}$ lines, and to a filter FLT2 for the $v_{qs}$ and $R_s i_{qs}$ lines. Accordingly, the inputted stator voltages $V_{ds}$ and $v_{qs}$, which with a PWM control system are loaded with noise, become a good quality voltage signal after filtering by FLT1 and FLT2, respectively, as this is done in analog form for REFMOD in FIG. 8. Corresponding signals are obtained in digital form (after conversion on lines 350 and 351) which are derived from the associated filter inputted into SB4 and SB7 (the latter being as in FIG. 4), respectively. Line 101 by line 201 and line 131 by line 205 go to two successive function generators accomplishing the functions $p./p.+1/T$ and $L_s$ at FGD1 and FGD2 for the direct component and at FGQ1 and FGQ2 for the quadrature component. One pair of functions is equivalent to block 105 for FGD2 and to blocks 107 and 151 for FGD1, whereas the other pair is equivalent to block 135 for FGQ2 and to blocks 137 and 154 for FGQ1 when comparing FIG. 8 and FIG. 3.

In the adjustable model ADMOD use of a function is made at FLT3 and FLT4 for the output line 235 of $\hat{\lambda}'_{dr}$ and the output line of $\hat{\lambda}'_{qr}$, respectively. These functions are equivalent to the combination of lines 233, 236, 237, 238 with subtractor SB11, on the one hand, and the combination of lines 213, 244, 247, 248 and subtractor SB13, on the other hand, in FIG. 7. FLT3 and FLT4 are implemented digitally in the two latter instances.

The estimate of speed can be used for many different purposes. For example, it can be used in a conventional speed control system. An illustration is given by FIG. 8. There, the signal of line 252, which is the estimated and confirmed speed $\hat{\omega}_r$, is kept in digital form and compared by a comparator SB19 with a reference speed applied on line 312. The error is passed first through a proportional loop by line 313, at 315 with a coefficient K3 and on line 314 inputted in a summer SB20, and by line 316 through another loop including an integrator at 317, then, by line 318 through an amplitude limiting function at 319 with the output on line 320 also inputted into summer SB20. The result, after another limiter at 322, is a signal characteristic of the slip frequency $\omega_s$. It is combined by summer SB21 with the rotor frequency of line 252 received by line 323, and the output thereof is converted by integration into an electrical angle when added by summer SB22 with a feedforward phase angle received on line 330 after conversion at 329 according to the relation angle $\phi = TAN^{-1}(\omega_s T2)$. The current vector magnitude is derived from the value of the slip frequency in relation to the two components of the right angle triangle by the formula:

$$\sqrt{1 + \omega_s^2 T2}.$$

This is done at 338. This value is multiplied (at M16) by $\cos \theta$ derived between lines 331 and 335 for one phase of current and, (at M17), by $\cos(\theta + 2\pi/3)$ derived between line 332 and line 336 for another phase of current. The results are an imposed current reference $i_a^*$ for one phase (line 340 from M16) and $i_c^*$ for the other phase (line 341 from M17). How the inverter and current of an induction motor are being controlled in response to such reference currents is generally known. For the purpose of such disclosure, the following is hereby incorporated by reference: "Introduction to Field Orientation and High Performance AC Drives", by D. W. Novotny and R. D. Lorenz; IEEE Industry Applications, Denver Sep. 28–29 1986, pp 5-1 to 5-23.

Figure 9:
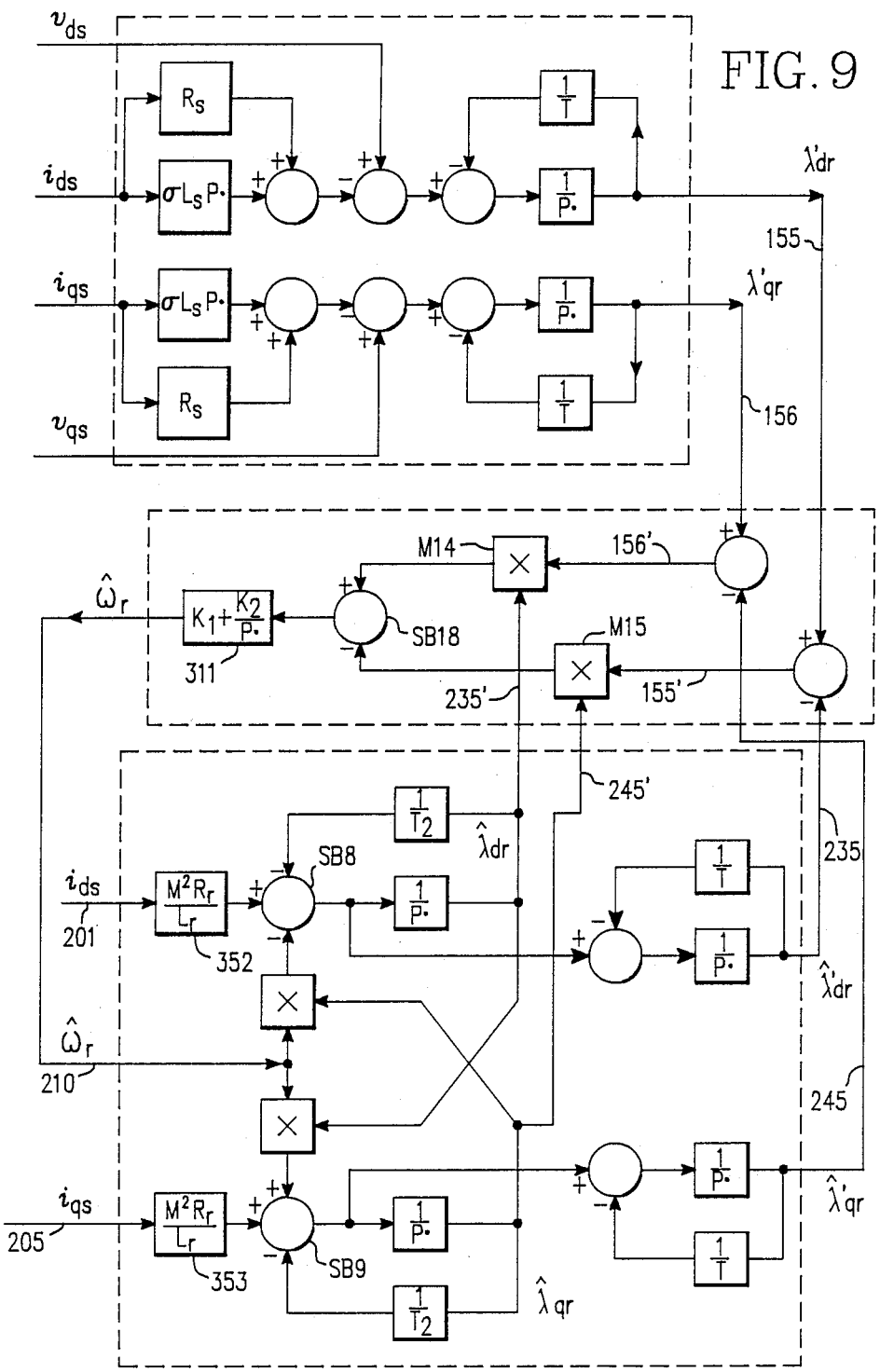
FIG. 9 is a speed identification system improved over the one of FIG. 7.

Referring to FIG. 9, an alternative implementation of the adaptation mechanism ADAM in the speed identification process of FIG. 7 is illustrated. Instead of combining as in FIG. 8 with a multiplier M14 one pair of direct and quadrature auxiliary variables of lines 156 and 235, and doing the same with a multiplier M15 for the other pair of quadrature and direct auxiliary variables (155 and 245) so as to provide respective inputs for summer SB18, in FIG. 9 the difference between the two direct components of the two opposite vectors, and the difference between the two quadrature flux components of the two opposite vectors, are made at SB23 and SB24, respectively. The quadrature difference outputted by SB23 on line 156' is multiplied at M14 by the non-auxiliary direct component of the flux $\lambda_{dr}$ derived from line 220 and applied by line 235'. Similarly, the direct difference outputted by SB24 on line 155' is multiplied at M15 by the non-auxiliary quadrature component $\lambda_{qr}$ derived from line 222 and applied by line 245'. In order to match the gains of the equations valid for either FIG. 7 or FIG. 9 with regard to the adjustable model ADMOD, at 352 and at 353, the inputted currents $i_{ds}$ and $i_{qs}$, respectively, are multiplied by the coefficient $M^2 R_r / L_r$.

I claim:

1. Apparatus for the determination of the rotor speed r of an induction motor having a squirrel cage rotor of stator resistance $R_r$, of stator reactance $L_r$, of rotor resistance $R_r$, of rotor reactance $L_r$, of mutual inductance M, a rotor flux represented by orthogonal components $\lambda_{dr}$ and $\lambda_{qr}$ in a stationary reference frame, the motor being supplied under three terminal voltages ($v_a$, $v_b$, $v_c$) and three line currents ($i_a$, $i_b$, $i_c$) derived from three AC phase lines without neutral connection, comprising:

means responsive to the terminal voltages and line currents for deriving signals representative of the direct and quadrature components ($v_{ds}$, $v_{qs}$) of the stator voltage vector and signals representative of the direct and quadrature components ($i_{ds}$, $i_{qs}$) of the current vector in accordance with the matrices:

$$\begin{bmatrix} v_{ds} \\ v_{qs} \end{bmatrix} = 2/3 \begin{bmatrix} 1 & -1/2 \\ 0 & -\sqrt{3}/2 \end{bmatrix} \begin{bmatrix} v_{ab} \\ v_{cb} \end{bmatrix}$$

$$\begin{bmatrix} i_{ds} \\ i_{qs} \end{bmatrix} = -2/\sqrt{3} \begin{bmatrix} -\sqrt{3}/2 & 0 \\ 1/2 & 1 \end{bmatrix} \begin{bmatrix} i_a \\ i_c \end{bmatrix}$$

with $i_a + i_b + i_c = 0$; $v_a + v_b + v_c = 0$; and $v_{ab}$ and $v_{bc}$ being line to line voltages;

reference model means responsive to said voltage vector and current vector direct and quadrature components representative signals in relation to the first rows of the following model matrix expressed in a stationary reference frame:

$$\begin{bmatrix} v_{ds} \\ v_{qs} \\ 0 \\ 0 \end{bmatrix} =$$

$$\begin{bmatrix} (R_s + L_s\sigma p.) & (0) & (M/L_r)p. & (0) \\ (0) & (R_s + L_s\sigma p.) & (0) & (M/L_r)p. \\ (-MR_r/L_r) & (0) & (R_r/L_r + p.) & \omega_r \\ (0) & (-MR_r/L_r) & -\omega_r & (R_r/L_r + p.) \end{bmatrix} \begin{bmatrix} i_{ds} \\ i_{qs} \\ \lambda_{dr} \\ \lambda_{qr} \end{bmatrix}$$

where:
$R_r$ is the resistance of the rotor;
$R_s$ is the resistance of the stator;
$L_r$ is the inductance of the rotor;
$L_s$ is the inductance of the stator;
$\lambda_{dr} = (Mi_{ds} + L_r i_{dr})$;
$\lambda_{qr} = (Mi_{qs} + L_r i_{qr})$;
$\sigma = (1 - M^2/L_s L_r)$ namely the motor leakage coefficient;

whereby said reference model means is generating first and second signals representative of the direct and quadrature components of the rotor flux vector, $\lambda_{dr}$ and $\lambda_{qr}$ respectively;

adjustable model means responsive on the one hand to said current vector direct and quadrature components signals, and on the other hand to an estimated signal $\hat{\omega}_r$ characteristic of rotor speed, and operative in relation to the two last rows of said model matrix, for generating respective third and fourth signals representative of the direct and quadrature components of a speed related rotor flux vector, $\lambda_{dr}$ and $\lambda_{qr}$;

means responsive to a deviation between the pair of said first and second signals, on the one hand, and the pair of said third and fourth signals on the other hand, for generating said estimated signal $\hat{\omega}_r$;

whereby said deviation, through said estimated signal, causes said speed related flux representative vector to be aligned with said flux representative vector and said estimated signal $\hat{\omega}_r$ to be equal to said rotor speed $\omega_r$.

2. The apparatus of claim 1, with said deviation responsive means including first and second multiplier means, one multiplier for multiplying the direct component of one pair by the quadrature component of the other pair, the other multiplier for multiplying the quadrature component of said one pair by the direct component of the other pair; and proportional and integral means being provided responsive to the difference between the outputs of said first and second multipliers for generating said estimated signal $\hat{\omega}_r$.

3. The apparatus of claim 1 with said rotor flux vector components being each converted within said reference model means through a the transfer function $s/(s+1/T)$ into auxiliary variables $\lambda'_{dr}$ and $\lambda'_{qr}$ as said first and second signals, where s is the Laplace operator and T a time constant; and with said speed related flux vector components being each converted within said adjustable model means through the transfer function $s/(s+1/s)$ into auxiliary variables $\hat{\lambda}'_{dr}$ and $\hat{\lambda}'_{qr}$, as said third and fourth signals, respectively.

4. The apparatus of claim 3, with said deviation responsive means including:

a first comparator operative with the difference between the direct components of said pairs, a second comparator operative with the difference between the quadrature components of said pairs;

a first multiplier operative in response to the first comparator and to a signal representative of the quadrature component of the speed related flux vector;

a second multiplier operative in response to the second comparator and to a signal representative of the direct component of the speed related flux vector; and proportional and integral means being provided responsive to the difference between the outputs of said first and second multipliers for generating said estimated speed signal $\hat{\omega}_r$.

5. The apparatus of claim 4 being part of an AC motor drive and including current controlled inverter means, means being provided in response to said estimated signal for generating current command signals for controlling said inverter means; whereby said three terminal voltages and three line currents are supplied to said motor in relation to a speed corresponding to said estimated signal.

* * * * *